(12) United States Patent
Missotten et al.

(10) Patent No.: US 9,414,546 B2
(45) Date of Patent: Aug. 16, 2016

(54) COMBINE HARVESTER WITH VARIABLE STROKE CLEANING SHOE

(71) Applicant: CNH Industrial America LLC, New Holland, PA (US)

(72) Inventors: Bart M. A. Missotten, Herent (BE); Bart Moutton, Gits (BE); Bruno De Cooman, Denderhoutem (BE); Marc E. Ramon, Bruges (BE); Frederik Tallir, Diksmuide (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/690,342

(22) Filed: Apr. 17, 2015

(65) Prior Publication Data

US 2016/0073587 A1    Mar. 17, 2016

(30) Foreign Application Priority Data

Apr. 22, 2014   (BE) .................................. 2014/0281

(51) Int. Cl.
| | |
|---|---|
| *A01F 12/32* | (2006.01) |
| *B07B 1/00* | (2006.01) |
| *A01F 12/44* | (2006.01) |
| *A01D 41/12* | (2006.01) |
| *A01F 12/56* | (2006.01) |
| *A01D 41/127* | (2006.01) |
| *A01D 75/28* | (2006.01) |

(52) U.S. Cl.
CPC .............. *A01F 12/446* (2013.01); *A01D 41/12* (2013.01); *A01D 41/1276* (2013.01); *A01D 75/282* (2013.01); *A01F 12/448* (2013.01); *A01F 12/56* (2013.01)

(58) Field of Classification Search
CPC ...... A01D 75/282; A01D 75/28; A01D 34/86; A01F 12/448; A01F 12/56; A01F 12/446; A01F 12/32
USPC ........................................ 460/101, 109, 102
See application file for complete search history.

(56) References Cited

U.S. PATENT DOCUMENTS

| 143,081 A | 9/1873 | Koons |
| 173,081 A | 9/1873 | Koons |
| 1,138,591 A | 5/1915 | Hawthorne |
| 2,212,092 A | 8/1940 | Wood |
| 2,893,558 A * | 7/1959 | Zollinger ............. A01D 75/282 209/254 |
| 4,598,718 A * | 7/1986 | Glaubitz .............. A01D 75/282 209/416 |

(Continued)

FOREIGN PATENT DOCUMENTS

| DE | 500467 C | 6/1930 |
| DE | 803497 C | 4/1951 |

(Continued)

*Primary Examiner* — Árpád Fábián-Kovács
(74) *Attorney, Agent, or Firm* — Patrick M. Sheldrake

(57) ABSTRACT

A sieve for a combine harvester that is moveable by a sieve drive assembly to perform a reciprocating sieve movement having a sieving stroke and a sieve throwing angle, wherein the sieve drive assembly has a rotary drive, having a rotatable output shaft, a transmission between the rotatable output shaft of the rotary drive and the sieve, an eccentric device, at least one transmission element, and a plurality of linkage pivots, wherein the eccentric device is an adjustable eccentric device in which the eccentricity is adjustable in order to adjust at least one of the sieving stroke and sieve throwing angle, the eccentric device comprising an input shaft, a flange, a gear, an output shaft, an annular gear, and an adjustment gear.

3 Claims, 8 Drawing Sheets

(56) References Cited

U.S. PATENT DOCUMENTS

| | | |
|---|---|---|
| 4,723,558 A | 2/1988 | Usick |
| 6,412,260 B1 | 7/2002 | Lukac et al. |
| 6,672,957 B2 | 1/2004 | Voss et al. |
| 7,322,882 B2 | 1/2008 | Duquesne et al. |
| 8,608,234 B2 * | 12/2013 | Haeusler .............. B60G 99/006 280/124.106 |
| 8,622,792 B1 * | 1/2014 | Murray ................. A01F 12/448 460/101 |
| 8,968,065 B2 | 3/2015 | Bilde |
| 2003/0186731 A1 * | 10/2003 | Voss ...................... A01F 12/448 460/101 |
| 2005/0282601 A1 * | 12/2005 | Duquesne ............ A01F 12/448 460/101 |
| 2006/0229119 A1 | 10/2006 | Wamhof et al. |
| 2015/0296712 A1 * | 10/2015 | Duquesne ............. A01F 12/448 460/101 |
| 2015/0296713 A1 * | 10/2015 | Moutton ................ A01F 12/448 460/101 |
| 2015/0305243 A1 * | 10/2015 | Duquesne ............. A01F 12/446 460/101 |
| 2015/0319931 A1 * | 11/2015 | Missotten .............. A01D 41/12 460/101 |

FOREIGN PATENT DOCUMENTS

| | | |
|---|---|---|
| DE | 9113652 U1 | 1/1992 |
| EP | 1712122 A1 | 10/2006 |
| GB | 359970 A | 10/1930 |

\* cited by examiner

COMBINE HARVESTER WITH VARIABLE STROKE CLEANING SHOE

This application claims the benefit of and priority to Belgium Patent Application No. BE2014/0281, filed Apr. 22, 2014, entitled COMBINE HARVESTER, which is hereby incorporated by reference in its entirety.

FIELD OF THE INVENTION

The invention pertains to a combine harvester, in particular to the drive of a sieve in the cleaning shoe of a combine harvester.

BACKGROUND OF THE INVENTION

Combine harvesters are widely used in the harvesting of various types of grain. Typically, a combine harvester comprises a cutter bar, which cuts the crop from the field. The harvested crop is threshed inside the combine harvester. The stalks of the harvested crop are generally removed from the combine harvester via a straw walker and a mixture of grain and smaller particles of material other than grain remains in the combine harvester.

This mixture is transported to a cleaning shoe, in which the threshed grain is separated from the material other than grain. The cleaning shoe generally comprises one or more sieves, which perform a reciprocating movement during use. The sieved grain is then collected and transported to the grain tank of the combine harvester, which is generally emptied periodically.

The sieve or sieves of the cleaning shoe are generally arranged at an angle relative to the horizontal, with the front end of the sieve (that is, the end closest to the cutter bar) lower than the rear end of the sieve. The reciprocating movement of the sieve makes that the grain is thrown upwards and backwards by the sieve. A fan blows air over and through the sieve, to catch the lighter particles of the material other than grain and keep them airborne until they are blown out of the combine harvester.

The effectiveness of the sieving process is dependent on many variables of the harvesting process and the harvesting conditions, like the particle size of the mixture, grain size, moisture content and the angle of the terrain over which the combine harvester moves. For example, when the combine harvester moves downhill, the angle of the sieve relative to the horizontal will become steeper, with the result that the mixture of grain and material other than grain travels over the sieve slower and more material accumulates on the sieve. On the other hand, when the combine harvester moves uphill, the angle of the sieve relative to the horizontal will become flatter, with the result that mixture of grain and material other than grain travels over the sieve faster and more grain leaves the combine harvester with the material other than grain.

EP 1712122 proposes to adjust the frequency and the stroke of the sieve in order to match the movement of the sieve with the actual parameters of the harvesting process by means of applying linear actuators. These linear actuators are for example cylinders or magnetic actuators.

The known system of EP 1712122 however has serious durability problems in the harsh working conditions inside a combine harvester.

SUMMARY OF THE INVENTION

The object of the invention is to provide an improved way for adjusting the sieve movement.

This object is achieved with the combine harvester of claim 1.

The combine harvester according to the invention comprises a combine harvester chassis and a cleaning shoe for separating threshed grain from material other than grain. This cleaning shoe comprises at least one sieve and an associated sieve drive assembly. The sieve is moveable by said sieve drive assembly to perform a reciprocating sieve movement. The reciprocating sieve movement has several movement parameters, including sieving stroke and sieve throwing angle. The sieve stroke is the distance between the foremost position and the hindmost position of the sieve during the sieve movement. The sieve throwing angle is the angle under which the grain is thrown up from the sieve during the reciprocating movement of the sieve, relative to the horizontal. Generally, the sieve follows a path that has the shape of an arc, which arc has a center of curvature. The angle a straight line through this center of curvature and through the point halfway of the arc makes relative to the vertical, generally matches the throwing angle.

The sieve frequency, which is the frequency of the reciprocating movement of the sieve, is also a parameter. The sieve stroke, sieve throwing angle and sieve frequency together determine the acceleration of the sieve during the sieving movement. The acceleration of the sieve varies, generally in a sinusoidal way, during the reciprocating sieve movement.

The reciprocating sieve movement generally will mainly take place in the plane of the sieve, but some additional movement in other directions is possible as well.

The sieve drive assembly comprises a rotary drive, which rotary drive comprises a rotatable output shaft. This rotatable output shaft could for example be a power take off shaft, e.g. a shaft that is driven by a belt or a toothed belt that is driven by a drive shaft elsewhere in the combine harvester.

The sieve drive assembly further comprises a transmission that connects the rotatable output shaft of the rotary drive to the sieve. The transmission receives a rotational movement from the rotary output shaft of the rotary drive and transforms that into the sieve movement, which is imposed on the sieve by the transmission.

The transmission comprises an eccentric device, at least one transmission element, and a plurality of linkage pivots. The eccentric device has an input that is connected to the rotatable output shaft and an output that is pivotably connected to a transmission element through a linkage pivot. The rotatable output shaft imposes its rotational movement on the input. The eccentric device has an eccentricity.

Optionally, the eccentric device comprises an eccentric disc which is driven by the rotary drive. The rotatable output shaft engages the eccentric disk at a location away from the center of the eccentric disk. In this case, the eccentricity of the eccentric device is the distance from the center of the disk to the location where the rotatable output shaft of the rotary drive engages the eccentric disk. In such an embodiment, the eccentric disk is optionally arranged in a bearing ring extending around the circumference of the disk, or there is point of contact between such an eccentric disk and a ring extending around this eccentric disk, wherein internal diameter of the ring is larger than the outer diameter of the eccentric disk. In both cases, the ring forms a linkage point.

Optionally, the eccentric device is a crank, that has an input that is connected to the rotatable output shaft of the rotary drive and an output that is pivotably connected to a transmission element through a linkage pivot. In this case, the eccentricity of the eccentric device is the distance between the input that is connected to the rotatable output shaft of the rotary drive and an output that is pivotably connected to a transmission element through a linkage pivot.

Each transmission element is associated with at least two associated linkage pivots. Each associated linkage pivot pivotably connects said transmission element with one of: another transmission element, the eccentric device, the sieve and/or the combine harvester chassis.

For example, in a system where just one transmission element is present, this transmission element can be connected to the eccentric device through a first linkage pivot that is arranged e.g. adjacent to one end of the transmission element. The first linkage pivot is in this case for example a ring around an eccentric disk or a pivot to a crank. This single transmission element is linked to the sieve through a second linkage pivot that is arranged e.g. adjacent to a second end of the transmission element. Optionally, this transmission element is associated with a third linkage pivot, that e.g. provides a pivotable connection to the chassis of the combine harvester.

In embodiments where multiple transmission elements are present, for example a transmission element can be present that is connected to the eccentric device through a first linkage pivot that is arranged e.g. adjacent to one end of the transmission element. The first linkage pivot is in this case for example a ring around an eccentric disk or a pivot to a crank. This transmission element is for example linked to another transmission element through a second linkage pivot that is arranged e.g. adjacent to a second end of said transmission element. It is further possible that there is at least one transmission element that is connected to the another transmission element through a first linkage pivot that is arranged e.g. adjacent to one end of the transmission element and to yet another transmission element through a second linkage pivot that is arranged e.g. adjacent to a second end of the transmission element.

In embodiments where multiple transmission elements are present, the transmission elements and their associated linkage pivots optionally form a linkage system.

During normal operational use of the sieve drive assembly, so when the sieve is performing the sieve movement, which sieve movement is driven by the sieve drive assembly when the combine harvester is harvesting crop, generally all linkage pivots that are associated with the same transmission element have a fixed distance relative to each other. Furthermore, in this situation, the eccentricity of the eccentric device is fixed, which means that it remains constant during normal operational use of the sieve drive assembly.

In accordance with the invention, the eccentric device is an adjustable eccentric device in which the eccentricity is adjustable in order to adjust the sieving stroke and/or sieve throwing angle. By adjusting the sieving stroke and/or the sieve throwing angle, the sieve movement can be adjusted to the actual harvesting process and the harvesting conditions, such as the particle size of the mixture of grain and material other than grain, grain size, moisture content of the mixture of grain and material other than grain and the angle of the terrain over which the combine harvester moves. Adjusting the sieving stroke and/or the sieve throwing angle and/or adjusting the sieve frequency further has an impact on the acceleration of the sieve, which also influences the sieving process.

The invention provides a robust sieve drive assembly, which is well suited to deal with the harsh conditions that are present inside a combine harvester during the harvesting process.

In a possible embodiment, the adjustment of the eccentricity of the eccentric device is not possible during normal operational use of the sieve drive assembly, but only when the sieve drive assembly is idle or in a dedicated adjustment mode. Preferably, no harvesting of crop takes place when the sieve drive assembly is in the adjustment mode.

In a possible embodiment, the adjustment unit comprises one or more gears.

In a possible embodiment, the adjustment unit comprises a locking device that is adapted to lock the eccentricity of the eccentric device, respectively. This way, it can be secured that the eccentricity of the eccentric device remains fixed during normal operational use of the sieve and the sieve drive assembly.

In a possible embodiment, the combine harvester further comprises an adjustment module that is adapted to adjust the eccentricity of the eccentric device. The adjustment module optionally comprises mechanical components, hydraulic components, electric components or a combination thereof.

In a possible embodiment, the adjustment module comprises an input module that is present in the driver's cabin of the combine harvester. The input module allows the driver to put in a desired setting for the sieving stroke and/or the sieve throwing angle. In addition or alternatively, desired setting can be determined by a control algorithm. The desired setting can be based on variables of the harvesting process and the harvesting conditions, like the particle size of the mixture, grain size, moisture content and the angle of the terrain over which the combine harvester moves. In this embodiment, the adjustment module further comprises an adjustment controller and an adjustment actuator. The adjustment actuator actuates the adjustable eccentric device. The adjustment controller controls the adjustment actuator on the basis of the settings it receives from the input module.

The input module and the adjustment controller are connected to each other by a data connection with each other, which data connection is either a wired connection or through a wireless connection. In case of the wireless connection, optionally both the input module and the adjustment controller comprise an receiver as well as a transmitter.

The adjustment actuator for example comprises a hydraulic pump and a reservoir for hydraulic fluid if the adjustment unit of the adjustable eccentric device comprises a hydraulic actuator. If the adjustment unit of the adjustable eccentric device comprises one or more gears, the adjustment actuator for example comprises an electric motor, e.g. a servomotor.

In an alternative embodiment, the adjustment module comprises a lever, a knob or other mechanic actuator to directly actuate the adjustment unit of the adjustable eccentric device.

In a possible embodiment, the eccentric device is an adjustable eccentric device, which eccentric device comprises:
an input shaft, which input shaft has a center line,
a flange, which is fixedly connected to the input shaft in order to rotate along with said input shaft around the center line of said input shaft,
a gear, which is provided with a toothing around its outer circumference, which gear is rotatably mounted onto the flange, the rotation axis of said gear being non-coaxial with respect to
the center line of the input shaft,
an output shaft, which is fixedly connected to said gear in order to rotate along with said gear around the rotation axis of said gear,
an annular gear, which annular gear has a toothing on its inner diameter and on its outer diameter, the toothing on the inner diameter of the annular gear engaging the toothing on the outer circumference of the gear,
said annular gear being stationary during normal operational use of the sieve drive assembly,
an adjustment gear, which is stationary during normal operational use of the sieve drive assembly, which adjustment gear is provided with toothing on its outer circumference, which toothing engages the toothing on the outer diameter of the annular gear.

BRIEF DESCRIPTION OF THE DRAWINGS

Possible embodiments of the sieve drive assembly in accordance with the invention will be discussed with reference to the drawings.

The invention will be described in more detail below under reference to the drawing, in which in a non-limiting manner exemplary embodiments of the invention will be shown.

The drawing shows in:

Figure 1:
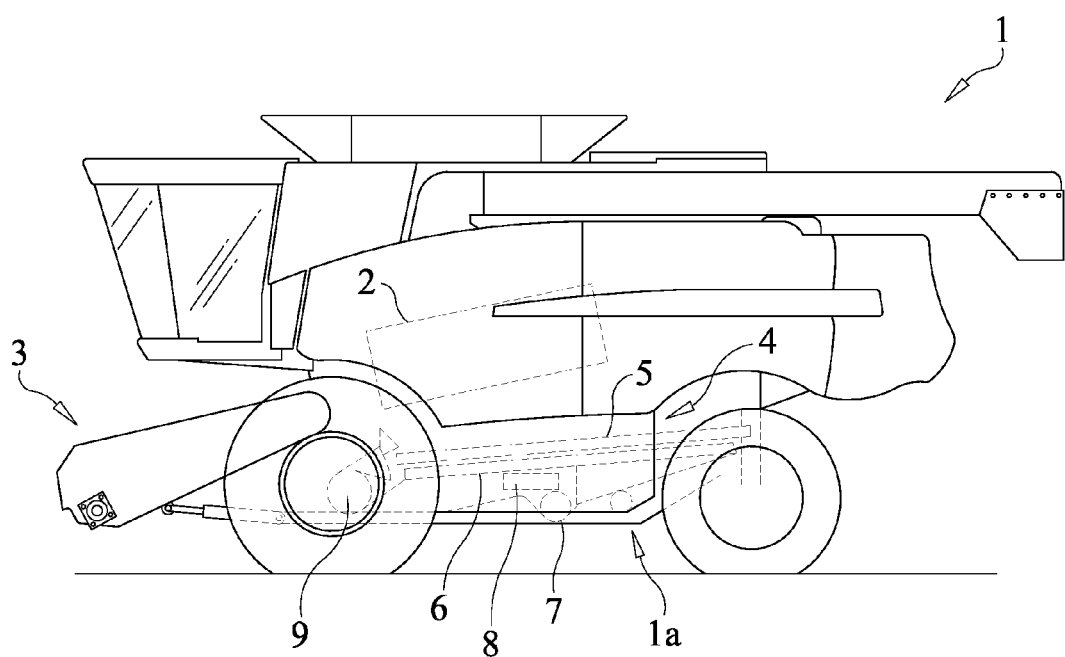
Figure 2:
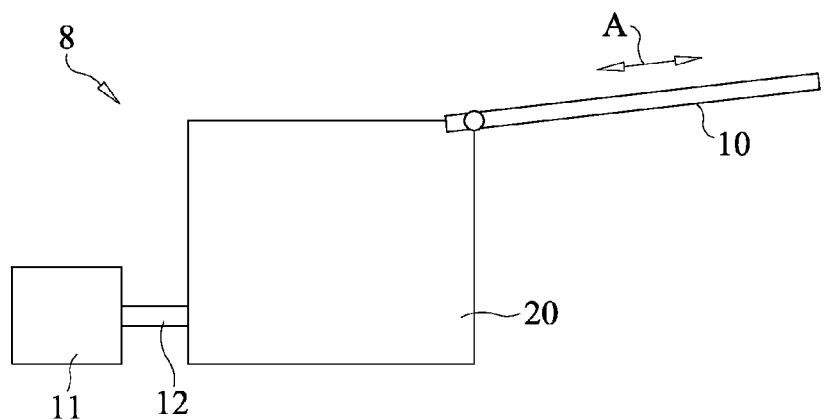
Figure 3:
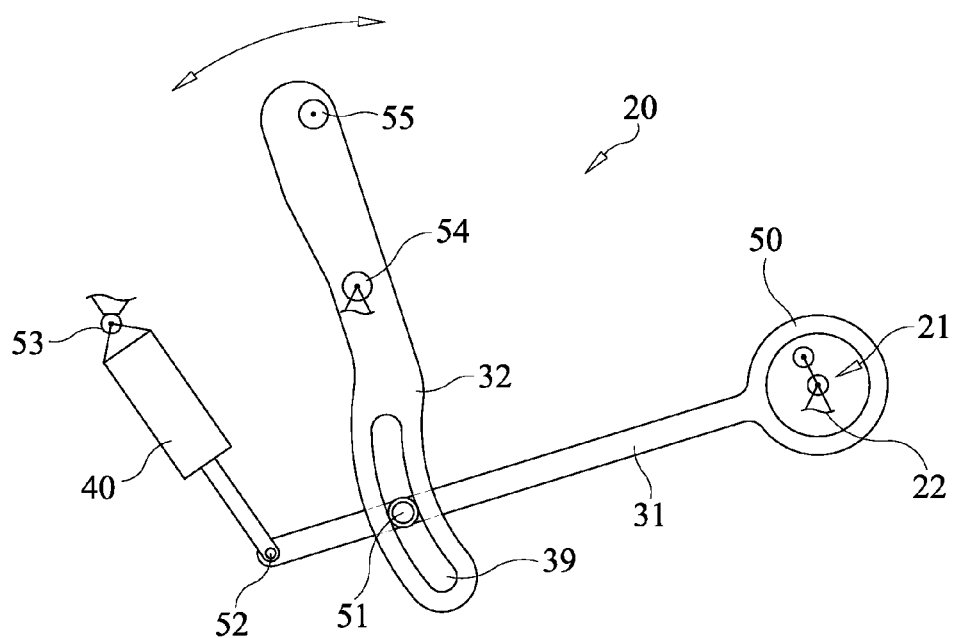
Figure 4:
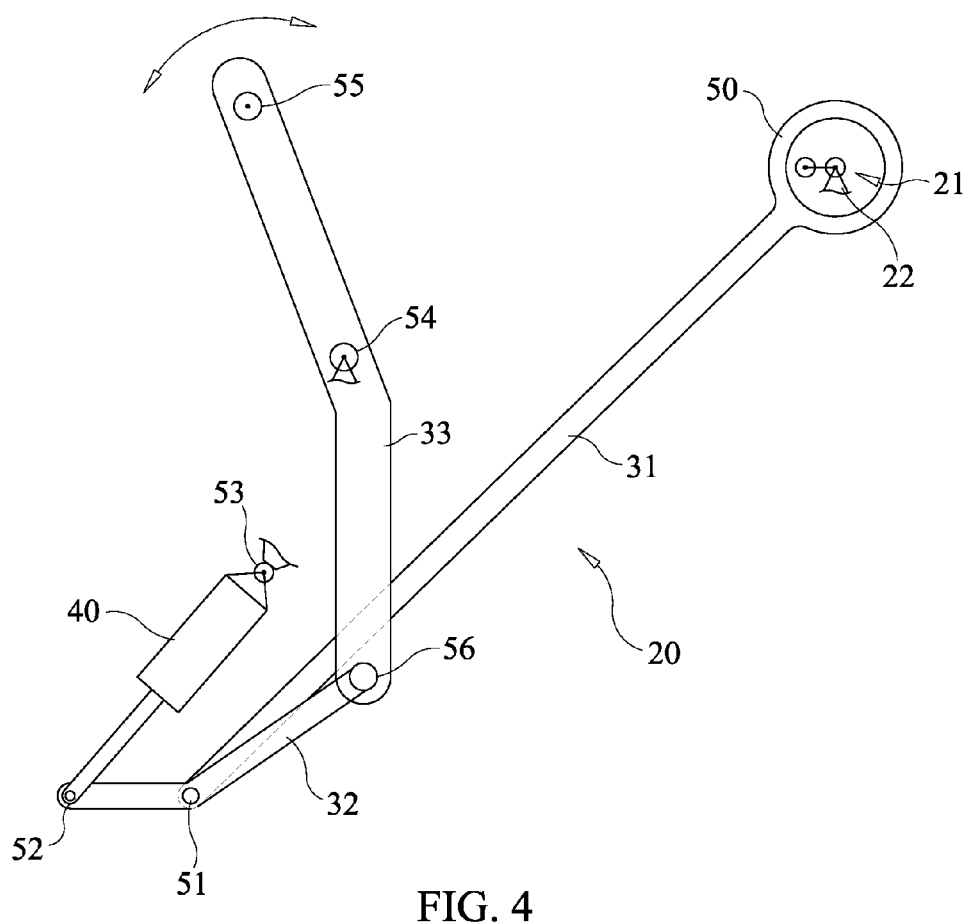
Figure 5:
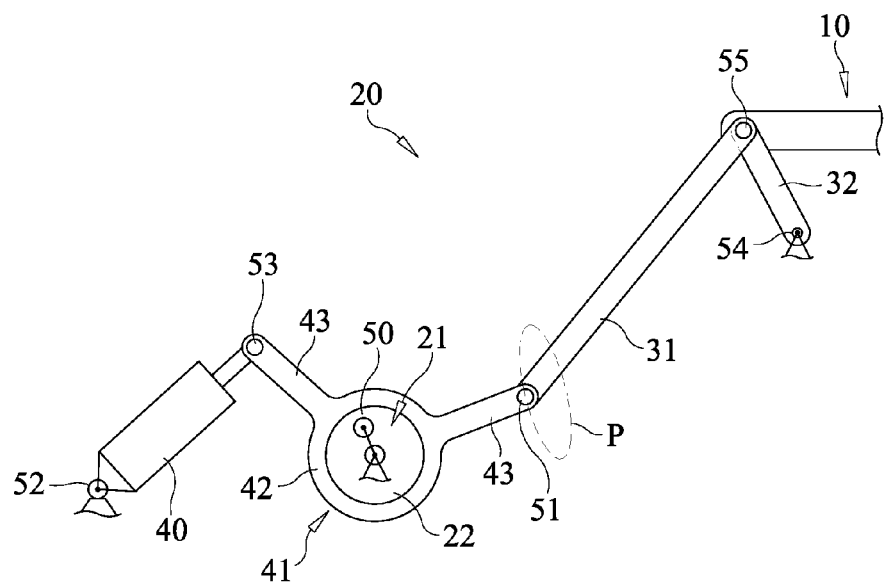
Figure 6:
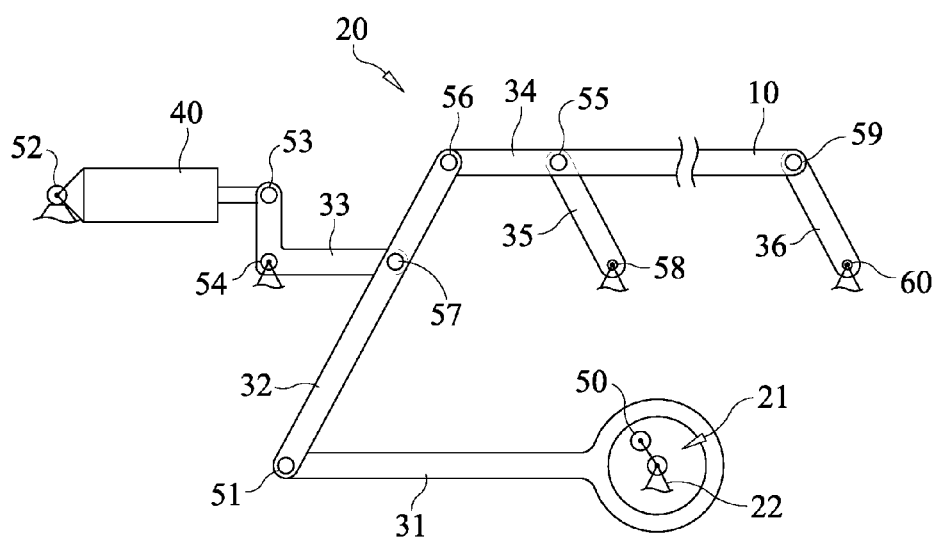
Figure 7:
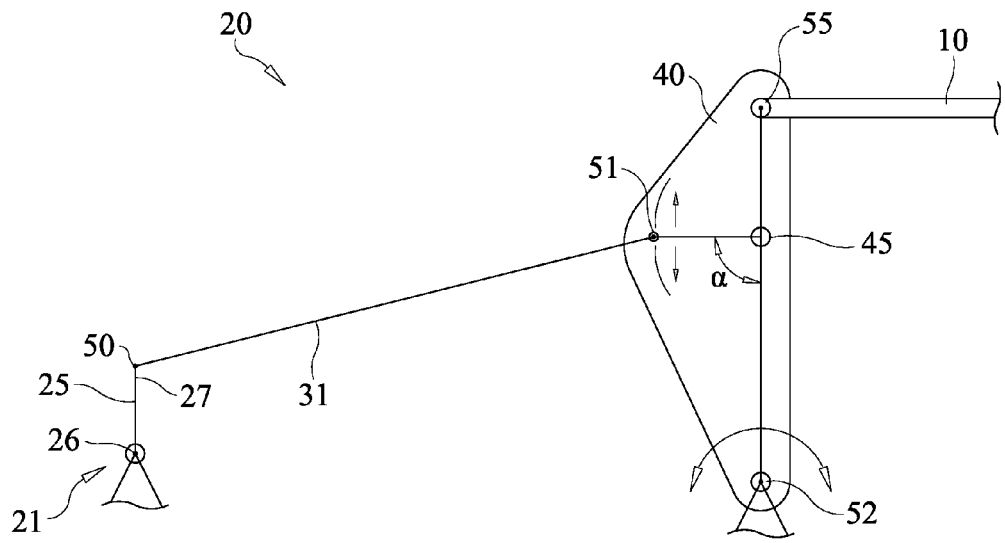
Figure 8A:
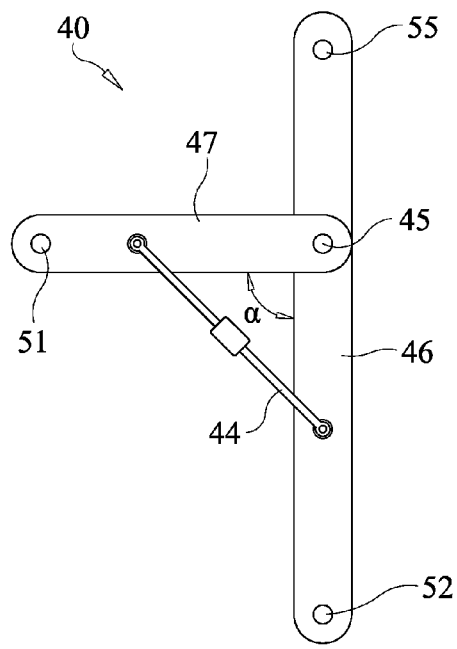
Figure 8B:
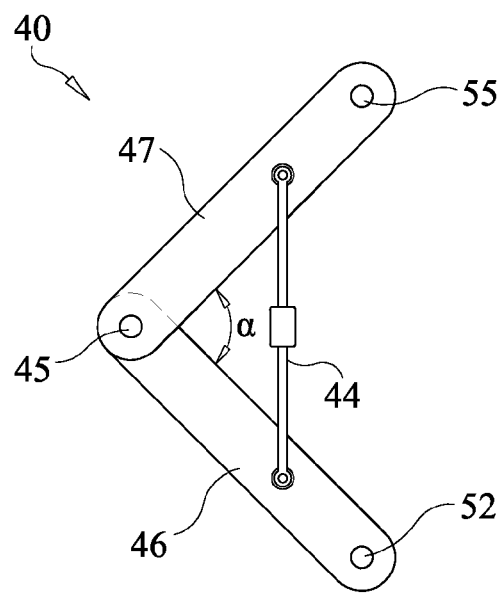
Figure 8C:
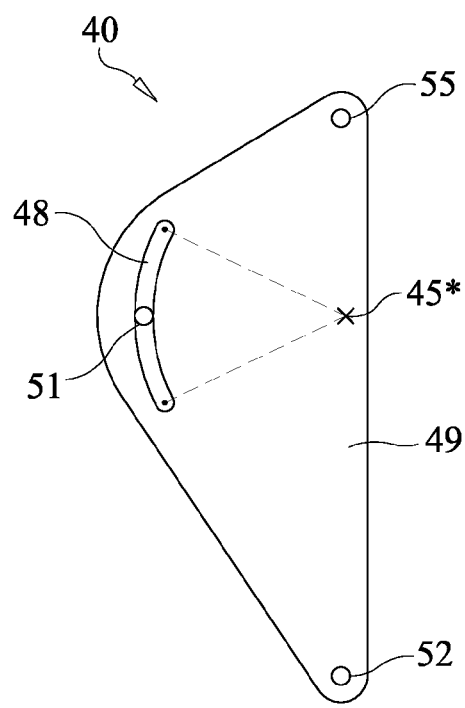
Figure 9:
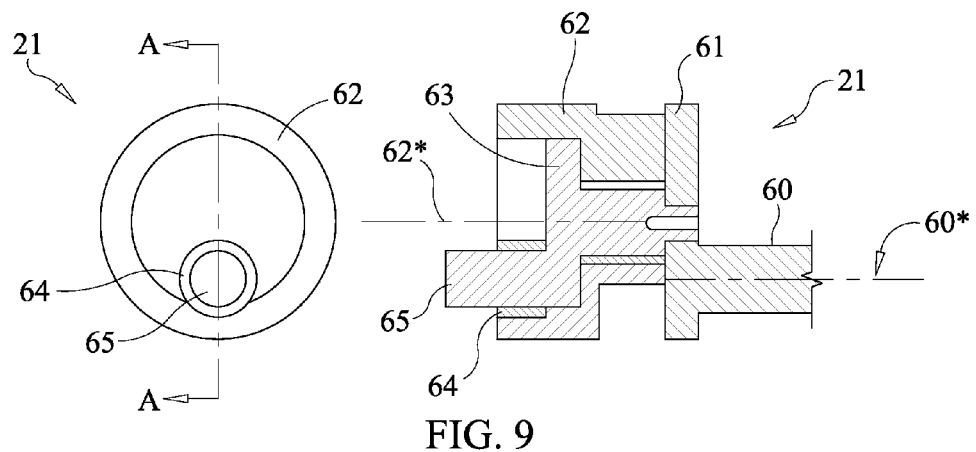
Figure 10:
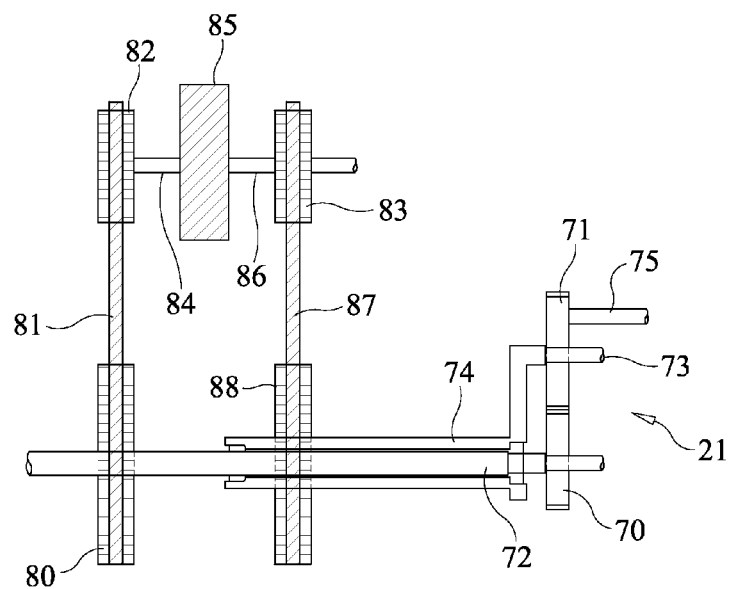
Figure 11:
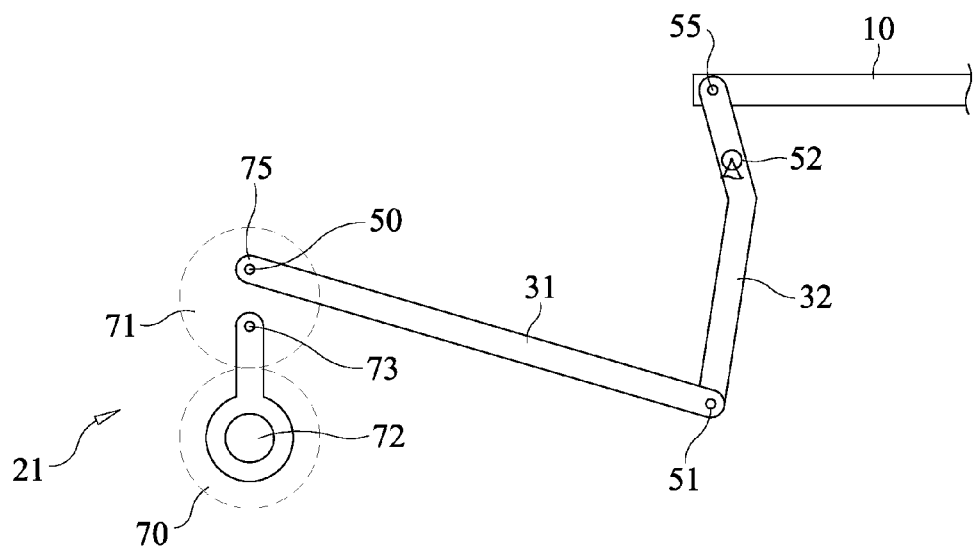
Figure 12:
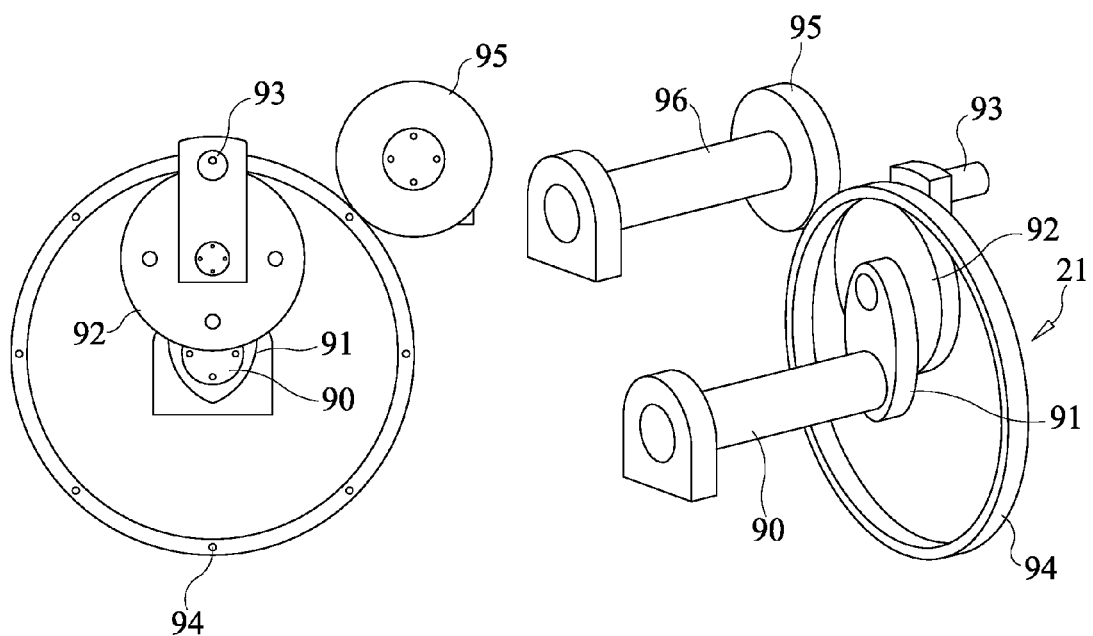

FIG. 1: a conventional agricultural combine harvester,

FIG. 2: schematically, a sieve and a sieve drive assembly,

FIG. 3: schematically, a first embodiment of a transmission of a sieve drive assembly according to the invention, FIG. 4: schematically, a second embodiment of a transmission of a sieve drive assembly according to the invention, FIG. 5: schematically, a third embodiment of a transmission of a sieve drive assembly according to the invention, FIG. 6: schematically, a fourth embodiment of a transmission of a sieve drive assembly according to the invention, FIG. 7: schematically, a fifth embodiment of a transmission of a sieve drive assembly according to the invention, FIG. 8A: first embodiment of adjustable transmission elements and associated linkage pivots, FIG. 8B: second embodiment of adjustable transmission elements and associated linkage pivots, FIG. 8C: third embodiment of adjustable transmission elements and associated linkage pivots, FIG. 9: schematically, a first embodiment of an adjustable eccentric device, in front view and in cross section, FIG. 10: schematically, a second embodiment of an adjustable eccentric device, in side view, FIG. 11: schematically, the second embodiment of FIG. 10, in front view, FIG. 12: schematically, a third embodiment of an adjustable eccentric device, in front view and in perspective.

DETAILED DESCRIPTION OF PREFERRED EMBODIMENTS

FIG. 1 shows a conventional agricultural combine harvester 1 having a combine harvester chassis 1a. The combine harvester 1 generally includes a thresher 2 operable for receiving crop material from a harvesting mechanism 3 on a front end of the combine harvester 1. The thresher 2 separates smaller grains, seeds, pods and related plant material from larger stalks, stems, leaves, husks and other elements of the crop material, as well as vines, weeds and the like which may be present in the harvested crop material. The smaller material falls from thresher 2 into one or more augers (not shown) disposed below thresher 2, which collect the smaller material and convey it to a cleaning shoe 4. The smaller material is a mixture of grain and material other than grain.

In the embodiment of FIG. 1, the cleaning shoe 4 comprises multiple sieves. However, simpler embodiments, where just a single sieve is present are possible as well.

The cleaning shoe 4 of FIG. 1 includes an upper, relatively coarse sieve 5. This coarse sieve 5 receives the mixture of grain and material other than grain from the thresher 2. Furthermore, a lower, relatively fine sieve 6 is provided. This fine sieve 6 receives grain or seeds which pass through the coarse sieve 5. Sieves 5, 6, separate the grain or seed from the remaining other material, such as pod fragments and the like. The grain or seed is collected below the sieves 5, 6, where an auger 7 is provided that conveys the clean grain or seeds to an elevator, which in turn conveys the clean grain or seeds upwardly to a grain tank.

The sieves 5, 6 are reciprocated to perform a reciprocating sieve movement by a sieve drive assembly 8 for facilitating sifting of the crop material therethrough. The reciprocating sieve movement also transports the material onto the sieve towards the rear of the combine harvester 1 by throwing the material upwards and backwards.

Material which does not pass through the sieves 5,6 is moved rearwardly on the coarse sieve 5 or the fine sieve 6 by reciprocal sieve movement. It drops from the rear end of the sieves 5,6 through an opening in the rear of combine 1 or into a return auger to be carried back to thresher 2 or coarse sieve 5. Optionally, a fan 9 is provided that blows a stream of air over the sieves 5, to catch the lighter particles of the material other than grain and keep them airborne until they blown out of the combine harvester 1.

FIG. 2 schematically shows a sieve 10, that during normal operational use performs a reciprocating sieve movement, generally indicated by the arrow A.

FIG. 2 further schematically shows the sieve drive assembly 8. The sieve drive assembly 8 comprises a rotary drive 11 with an output shaft 12. A transmission 20 is arranged to provide a connection between the rotatable output shaft 12 of the rotary drive 11 and the sieve 10. The transmission 20 is adapted to transform a rotational movement of the rotatable output shaft 12 into the reciprocating sieve movement of the sieve 10.

By changing the rotational speed of the rotatable output shaft 12 of the rotary drive 11, the sieve frequency of the reciprocating sieve movement can be changed. FIG. 3 shows a first embodiment of a transmission 20 of a sieve drive assembly according to the invention. In this embodiment, the transmission 20 comprises a single adjustable transmission element. There is no adjustable eccentric device; in this embodiment, the eccentric device has a fixed eccentricity.

The transmission 20 of FIG. 3 comprises an eccentric device 21, which is a non-adjustable eccentric device. The eccentric device has an eccentric disk 22 that is connected to the rotatable output shaft of the rotary drive (not shown in FIG. 3) in a fixed way, causing the eccentric disk 22 to rotate along with the rotatable output shaft, for example as indicated by the arrow. The eccentric disk 22 is connected to the rotatable output shaft of the rotary drive at a location away from the center of the eccentric disk 22.

The transmission 20 further comprises three transmission elements 31, 32, 40. One transmission element is an adjustable transmission element 40.

The transmission 20 further comprises six linkage pivots 50,51,52,53,54,55. Linkage pivot 50 connects the eccentric disk 22 of the eccentric device 21 to the first non-adjustable transmission element 31 in a pivotable manner. In this example, linkage pivot 50 is formed by a bearing that extends around the eccentric disk 22 of the eccentric device. Linkage pivot 51 connects the first non-adjustable transmission element 31 to the second non-adjustable transmission element 32 in a pivotable manner. A slot 39 has been provided in the second non-adjustable transmission element 32 to allow the first non-adjustable transmission element 31 to make the movements that are imposed on it by the eccentric device 21.

The embodiment of FIG. 3 is an example of an embodiment in which it is necessary that a linkage pivot moves along a certain trajectory relative to the associated transmission element during normal operation of the sieve drive assembly. This movement does not cause an adjustment of the sieving stroke or the sieve throwing angle, and therefore it is not regarded as an adjustment of the distance between at least two linkage pivots associated with an adjustable transmission element.

The second non-adjustable transmission element 32 is pivotably connected to the combine harvester chassis through linkage pivot 54 and to the sieve through linkage pivot 55. So, the stroke that linkage pivot 55 makes corresponds to the sieving stroke.

Transmission element 40 is an adjustable transmission element. It is connected to the combine harvester chassis through linkage pivot 53 and to the first non-adjustable transmission element 31 via linkage pivot 52. In this embodiment, the adjustable transmission element 40 is formed by an actuator, for example an hydraulic actuator. The hydraulic actuator acts as the adjustment unit and as the adjustable transmission element at the same time.

The transmission elements 31, 32, 40 and the linkage pivots 50,51,52,53,54,55 together form a linkage system that is driven by eccentric device 21.

When it is desired to adjust the sieving stroke, the stroke made by linkage pivot 55 is to be adjusted. In the embodiment of FIG. 3, this is achieved by adjusting the length of the adjustable transmission element 40. As the linkage pivots 53,52 are arranged at both ends of the adjustable transmission element 40, changing the length of the adjustable transmission element 40 also changes the distance between the two linkage pivots 52, 53 that are associated with the adjustable transmission element 40.

This results in an adjustment of the stroke made by linkage pivot 55 and therewith in an adjustment of the sieving stroke.

When the length of the adjustable transmission element has been adjusted, it is fixed again and it will remain fixed during normal operation of the sieve drive assembly.

FIG. 4 shows a second embodiment of a transmission 20 of a sieve drive assembly according to the invention. In this embodiment, the transmission 20 comprises a single adjustable transmission element. There is no adjustable eccentric device; in this embodiment the eccentric device has a fixed eccentricity.

The transmission 20 of FIG. 4 comprises an eccentric device 21, which is a non-adjustable eccentric device. The eccentric device has an eccentric disk 22 that is connected to the rotatable output shaft of the rotary drive (not shown in FIG. 4) in a fixed way, causing the eccentric disk 22 to rotate along with the rotatable output shaft, for example as indicated by the arrow. The eccentric disk 22 is connected to the rotatable output shaft of the rotary drive at a location away from the center of the eccentric disk 22.

The transmission 20 further comprises four transmission elements 31, 32, 33, 40. One transmission element is an adjustable transmission element 40.

The transmission 20 further comprises seven linkage pivots 50,51,52,53,54,55,56. Linkage pivot 50 connects the eccentric diske 22 to the first non-adjustable transmission element 31 in a pivotable manner. In this example, linkage pivot 50 is formed by a bearing that extends around the eccentric disk 22 of the eccentric device 21. Linkage pivot 51 connects the first non-adjustable transmission element 31 to the second non-adjustable transmission element 32 in a pivotable manner. Linkage pivot 52 connects the second non-adjustable transmission element 32 to the adjustable transmission element 40 in a pivotable manner. Linkage pivot 56 connects the second non-adjustable transmission element 32 to the third non-adjustable transmission element 33 in a pivotable manner.

The third non-adjustable transmission element 33 is pivotably connected to the combine harvester chassis through linkage pivot 54 and to the sieve through linkage pivot 55. So, the stroke that linkage pivot 55 makes corresponds to the sieving stroke.

Transmission element 40 is an adjustable transmission element. It is connected to the combine harvester chassis through linkage pivot 53 and to the second non-adjustable transmission element 32 via linkage pivot 52. In this embodiment, the adjustable transmission element 40 is formed by an actuator, for example an hydraulic actuator. The hydraulic actuator acts as the adjustment unit and as the adjustable transmission element at the same time.

The transmission elements 31, 32, 33, 40 and the linkage pivots 50,51,52,53,54,55,56 together form a linkage system that is driven by eccentric device 21.

When it is desired to adjust the sieving stroke, the stroke made by linkage pivot 55 is to be adjusted. In the embodiment of FIG. 4, this is achieved by adjusting the length of the adjustable transmission element 40. As the linkage pivots 53,52 are arranged at both ends of the adjustable transmission element 40, changing the length of the adjustable transmission element 40 also changes the distance between the two linkage pivots 52, 53 that are associated with the adjustable transmission element 40.

This results in an adjustment of the stroke made by linkage pivot 55 and therewith in an adjustment of the sieving stroke.

When the length of the adjustable transmission element has been adjusted, it is fixed again and it will remain fixed during normal operation of the sieve drive assembly.

FIG. 5 shows a third embodiment of a transmission 20 of a sieve drive assembly according to the invention. In this embodiment, the transmission 20 comprises an adjustable transmission element. There is no adjustable eccentric device; the eccentric device has a fixed eccentricity.

The transmission 20 of FIG. 5 comprises an eccentric device 21, which is a non-adjustable eccentric device. The eccentric device has an eccentric disk 22 that is connected to the rotatable output shaft of the rotary drive (not shown in FIG. 4) in a fixed way, causing the eccentric disk 22 to rotate along with the rotatable output shaft, for example as indicated by the arrow. The eccentric disk 22 is connected to the rotatable output shaft of the rotary drive at a location away from the center of the eccentric disk 22.

In the embodiment of FIG. 5, the transmission 20 comprises an adjustable transmission element 40. In this embodiment, the adjustable transmission element 40 is formed by an actuator, for example a hydraulic actuator.

In this embodiment, there is also a first non-adjustable transmission element 41. This first non-adjustable transmission element 41 comprises an outer element 42 that extends around the eccentric disk 22 and has two arms 43. A bearing extends around eccentric disk 22 to form linkage pivot 50.

The outer element 42 is associated with two linkage pivots 51,53 that are situated at the arms 43. Linkage pivot 53 pivotably connects the first non-adjustable transmission element 41 to the adjustable transmission element 40. Linkage pivot 51 pivotably connects the first non-adjustable transmission element 41 to a second non-adjustable transmission element 31.

The second non-adjustable transmission element 31 is pivotably connected to sieve 10 through linkage pivot 55. The transmission 20 of FIG. 5 further comprises a third non-adjustable transmission element 32. The third non-adjustable transmission element 32 is pivotably connected to the sieve also through linkage pivot 55. Furthermore, it is pivotably connected to the combine harvester chassis through linkage pivot 54.

In this embodiment of the transmission, the sieving stroke and the sieve throwing angle both can be adjusted by changing the relative position of the outer element 42 and the first non-adjustable transmission element 41 and location of where the rotatable output shaft of the rotary drive is fixed to the eccentric disk 22 of the eccentric device 21. After the adjustment has taken place, the relative position of the outer element 42 of the first non-adjustable transmission element 41 and the eccentric disk 22 is fixed again and it will remain so during normal operational use of the sieve drive assembly.

The relative position of the outer element 42 of the first non-adjustable transmission element 41 and the eccentric disk 22 can be adjusted by changing the distance between the linkage pivots 52, 53 that are associated with the adjustable transmission element 40.

In normal operation of the sieve drive assembly, the linkage pivot 51 follows a path P in the form of a closed loop. When the relative position of the outer element 42 and of the first non-adjustable transmission element 41 and the eccentric disk is changed, the shape of path P also changes, and therewith the throwing angle and sieving stroke of the reciprocation sieve movement will also change.

FIG. 6 shows a fourth embodiment of a transmission 20 of a sieve drive assembly according to the invention. This embodiment comprises six non-adjustable transmission elements and one adjustable transmission element. Eleven linkage pivots are present.

The transmission 20 of FIG. 6 comprises an eccentric device 21, which is a non-adjustable eccentric device. The eccentric device has an eccentric disk 22 that is connected to the rotatable output shaft of the rotary drive (not shown in FIG. 4) in a fixed way, causing the eccentric disk 22 to rotate along with the rotatable output shaft, for example as indicated by the arrow. The eccentric disk 22 is connected to the rotatable output shaft of the rotary drive at a location away from the center of the eccentric disk 22.

In the embodiment of FIG. 6, the transmission 20 comprises a first adjustable transmission element 40. In this embodiment, the first adjustable transmission element 40 is formed by an actuator, for example an hydraulic actuator. The hydraulic actuator acts as the adjustment unit and as the adjustable transmission element at the same time.

The eccentric device 21 is pivotably connected to a first non-adjustable transmission element 31 through linkage pivot 50. In this example, linkage pivot 50 is formed by a bearing that extends around the eccentric disk 22 of the eccentric device 21. First non-adjustable transmission element 31 is pivotably connected to a second non-adjustable transmission element 31 through linkage pivot 51. Second non-adjustable transmission element 32 is pivotably connected to a third non-adjustable transmission element 33 through linkage pivot 57 and to a fourth non-adjustable transmission element 34 through linkage pivot 56. Fourth non-adjustable transmission element 34 is pivotably connected to the sieve 10 through linkage pivot 55 and pivotably connected to the combine harvester chassis through linkage pivot 58. Fifth non-adjustable transmission element 35 is pivotably connected to the sieve 10 through linkage pivot 59 and pivotably connected to the combine harvester chassis through linkage pivot 60.

The third non-adjustable transmission element 33 is pivotably connected to the combine harvester chassis through linkage pivot 54 and to the adjustable transmission element 40 through linkage pivot 53.

In a variant of this embodiment, the fourth non-adjustable transmission element 34 and the linkage pivot 56 are omitted. The second non-adjustable element is then directly pivotable connected to the sieve through linkage pivot 55. An effect of the presence of the fourth non-adjustable transmission element 34 is that it allows to adjust the sieving stroke without changing the throwing angle.

When it is desired to adjust the sieving stroke, the stroke made by linkage pivot 55 is to be adjusted. In the embodiment of FIG. 6, this is achieved by adjusting the length of the adjustable transmission element 40. As the linkage pivots 53,52 are arranged at both ends of the adjustable transmission element 40, changing the length of the adjustable transmission element 40 also changes the distance between the two linkage pivots 52, 53 that are associated with the adjustable transmission element 40.

This results in an adjustment of the stroke made by linkage pivot 55 and therewith in an adjustment of the sieving stroke.

When the length of the adjustable transmission element has been adjusted, it is fixed again and it will remain fixed during normal operation of the sieve drive assembly.

FIG. 7 shows a fifth embodiment of a transmission 20 of a sieve drive assembly according to the invention. This embodiment comprises one non-adjustable transmission element and one adjustable transmission element. Four linkage pivots are present.

The transmission 20 of FIG. 7 comprises a crank 25 as the eccentric device 21. The crank is a non-adjustable crank. The crank 25 has a crank input 26 and a crank output 27. The crank input 26 is connected to the rotatable output shaft of the rotary drive (not shown in FIG. 7) in a fixed way, causing the crank 25 to rotate along with the rotatable output shaft, for example as indicated by the arrow.

The crank 25 is pivotably connected to the non-adjustable transmission element 31 through linkage pivot 50. The non-adjustable transmission element 31 is pivotably connected to the adjustable transmission element 40 through linkage pivot 51. The adjustable transmission element 40 is pivotably connected to the combine harvester chassis through linkage pivot 52. The adjustable transmission element 40 is further pivotably connected to the sieve 10 through linkage pivot 55. The adjustable transmission element 40 further comprises an adjustment pivot 45. Unlike a linkage pivot, the adjustment pivot 45 does not provide a pivotable connection during normal operational use of the sieve drive assembly. During the normal operational use, the adjustment pivot is locked.

In this embodiment, linkage pivot 51 is pivotable around adjustment pivot 45 when the adjustable transmission element is adjusted to adjust the stroke of the sieve. By pivoting the linkage pivot 51 around adjustment pivot 45, the distance of linkage pivot 51 to the linkage pivots 52 and 55 associated with the same transmission element 40 is adjusted. Adjusting this distance changes the sieving stroke.

In the embodiment of FIG. 7, by way of example, the adjustment pivot 45 is arranged on the straight line that connects the linkage pivots 52 and 55. This line and the straight line that connects linkage pivot 51 and adjustment pivot 45 are under a relative angle α as indicated in FIG. 7. When adjusting the sieving stroke by means of pivoting linkage pivot 51 around adjustment pivot 45, this angle α is adjusted. After the adjustment, the angle α is fixed again and it will remain fixed during normal operation of the sieve drive assembly.

FIG. 8A-C shows several examples of adjustable transmission elements 40 and associated linkage pivots.

In the example of FIG. 8A, the adjustable transmission element 40 comprises a first link segment 46, a second link segment 47, an adjustment pivot 45 and a locking device 44. The adjustable transmission element 40 is associated with three linkage pivots 51, 52, 55 to pivotably connect the adjustable transmission element 40 with one or more other transmission elements, the eccentric device, the sieve and/or the combine harvester chassis.

The adjustable transmission element 40 of FIG. 8A is adjusted by adjusting the angle α as indicated in FIG. 8A. By adjusting the angle α, the distance of linkage pivot 51 to the linkage pivots 52 and 55 is adjusted. After the adjustment, the angle α is fixed again and it will remain fixed during normal operation of the sieve drive assembly.

The locking device 44 locks the angle α during normal operation of the sieve drive assembly. The locking device 44 could for example be a lockable actuator (e.g. a hydraulic cylinder) or a threaded spindle.

Optionally, the locking device 44 comprises an adjustment actuator that performs the adjustment of the angle α and after the adjustment, fixes the angle α during normal operation of the sieve drive assembly.

FIG. 8B shows a second example of an adjustable transmission element 40. In the example of FIG. 8B, the adjustable transmission element 40 comprises a first link segment 46, a second link segment 47, an adjustment pivot 45 and a locking device 44. The adjustable transmission element 40 is associated with two linkage pivots 52, 55 to pivotably connect the adjustable transmission element 40 with one or more other transmission elements, the eccentric device, the sieve and/or the combine harvester chassis.

The adjustable transmission element 40 of FIG. 8B is adjusted by adjusting the angle α as indicated in FIG. 8B. By adjusting the angle α, the distance between linkage pivot 52 and linkage pivot 55 is adjusted. After the adjustment, the angle α is fixed again and it will remain fixed during normal operation of the sieve drive assembly.

The locking device 44 locks the angle α during normal operation of the sieve drive assembly. The locking device 44 could for example be a lockable actuator (e.g. a hydraulic cylinder) or a threaded spindle.

Optionally, the locking device 44 comprises an adjustment actuator that performs the adjustment of the angle α and after the adjustment, fixes the angle α during normal operation of the sieve drive assembly.

The adjustable transmission element 40 as shown in FIG. 8B could for example be applied instead of a linear actuator. It is particular suitable for use in harsh environments, as it is a robust embodiment.

FIG. 8C shows a third example of an adjustable transmission element 40. In the example of FIG. 8C, the adjustable transmission element 40 comprises a chassis plate 49 with a slot 48. The adjustable transmission element 40 is associated with three linkage pivots 51, 52, 55 to pivotably connect the adjustable transmission element 40 with one or more other transmission elements, the eccentric device, the sieve and/or the combine harvester chassis.

In the example of FIG. 8C, linkage pivot 51 can be arranged at any position in the slot. By changing the position of the linkage pivot 51 in the slot 48, the distance of linkage pivot 51 to the linkage pivots 52 and 55 is adjusted. After the adjustment, the position of the linkage pivot 51 in the slot 48 is fixed again and it will remain fixed during normal operation of the sieve drive assembly.

For example, the linkage pivot 51 comprises a clamp. The clamp is loosened when the position of linkage pivot 51 in the slot 48 is adjusted, and the clamp is tightened again when this position has to be fixed.

Optionally, as shown in FIG. 8C, the slot 48 has the shape of a circle segment, with a center of curvature 45*. The center of curvature 45* forms a virtual adjustment pivot.

An adjustable transmission element of the type shown in FIG. 8C can for example be used in the embodiment of FIG. 7.

In the above embodiments, the eccentric device 21 has a fixed eccentricity, and one or more of the transmission elements is/are adjustable. Below, some embodiments of adjustable eccentric devices will be discussed.

It is possible that the transmission comprises an adjustable eccentric device instead of or in addition to one or more adjustable transmission elements.

The adjustable eccentric device is connected to the sieve through one or more transmission elements. These transmission elements can be adjustable or non-adjustable.

In a possible embodiment, the transmission of a combine harvester according to the invention comprises an adjustable eccentric device and only one or more non-adjustable transmission elements (no adjustable transmission elements).

In a possible embodiment, the transmission of a combine harvester according to the invention comprises an adjustable eccentric device and a combination of adjustable and non-adjustable transmission elements.

In a possible embodiment, the transmission of a combine harvester according to the invention comprises an adjustable eccentric device and only one or more adjustable transmission elements (no non-adjustable transmission elements).

FIG. 9 shows a first embodiment of an adjustable eccentric device 21, in front view and in cross section.

In the embodiment of FIG. 9, an input shaft 60 with center line 60* is provided. The input shaft 60 is provided with an eccentric flange 61. Hollow shaft 62, in particular the center line 62* of the hollow shaft 62, forms the output. A linkage pivot (not shown in FIG. 9) pivotably connects the hollow shaft 62 to a transmission element, and the pivot axis of this linkage pivot coincides with the center line 62* of the hollow shaft 62.

So, in this embodiment, the eccentricity equals the distance between the center line 60*of the shaft 60 and the center line 62* of the hollow shaft 62.

The adjustable eccentric device 21 further comprises intermediate element 63 and gear 64. The gear 64 is arranged on a protrusion 65 of the intermediate element 63 and engages an internal toothing that is provided on the inside of the hollow shaft 62. The intermediate element 63 is eccentrically connected to the eccentric flange 61. The intermediate element 63 is eccentrically positioned relative to the center line 60* of the input shaft 60. The hollow shaft 62 is mounted onto the intermediate element 63.

During normal operational use of the sieve drive assembly, the gear 64, the intermediate element 63, the hollow shaft 62 and the input shaft 60 maintain a fixed position relative to each other. So, the distance between the center line 60*of the shaft 60 and the center line 62* of the hollow shaft 62 (and thus the eccentricity) remains constant.

When the eccentricity, so the distance between the center line 60*of the shaft 60 and the center line 62* of the hollow shaft 62, is to be adjusted in order to adjust the sieving stroke or sieve throwing angle, the gear 64 rotates about protrusion 65 and therewith relative to the hollow shaft 62. Therewith, the angular position of the hollow shaft 62 relative to the intermediate element 63 changes. As the connection between the intermediate element 63 and the eccentric flange 61 of the input shaft 60 remains fixed, the eccentricity of the hollow shaft relative to the center line 60* of the input shaft 60 changes. Therewith, the distance between the center line 60*of the shaft 60 and the center line 62* of the hollow shaft 62 changes.

Due to this, the eccentricity of the center device changes, and therewith the sieving stroke and/or the sieve throwing angle is adjusted.

After the adjustment has been made, the gear 64, the intermediate element 63, the hollow shaft 62 and the input shaft 60 again maintain a fixed position relative to each other.

FIG. 10 and FIG. 11 show a second embodiment of an adjustable eccentric device 21.

In this embodiment, two gears 70, 71 are present which are in engagement with each other. Gear 70 is mounted on shaft 72, gear 71 is mounted on shaft 73. Shaft 73 is mounted eccentrically 10 on a hollow shaft 74, which extends around the shaft 72 onto which the other gear 70 is mounted. In this embodiment, output shaft 75 is mounted on the gear 71 that is mounted eccentrically on the hollow shaft 74, and the input in this embodiment is the input shaft 72 onto which the other gear 70 is mounted.

The output shaft 75 is pivotably connected to first non-adjustable transmission element 31 through linkage pivot 50. First non-adjustable transmission element 31 is pivotably connected to second non-adjustable transmission element 32 through linkage pivot 51. Second non-adjustable transmission element 32 is pivotably connected to the combine harvester chassis through linkage pivot 52 and to the sieve 10 via linkage pivot 55.

During normal operational use of the sieve drive assembly, the gears 70, 71 maintain a fixed angular position relative to each other. They rotate around input shaft 72 together, but do not rotate relative to each other. During normal operational use of the sieve drive assembly, gear 71 rotates about the input shaft 72 and not about the shaft 73.

When the sieving stroke is to be adjusted, the gears 70, 71 are made to rotate somewhat relative to each other. This way, distance between the input shaft 72 and the output shaft 75 changes, and therewith the eccentricity changes.

After the adjustment has been made, the gears 70, 71 again maintain a fixed angular position relative to each other.

FIG. 10 further shows a possible embodiment of a mechanism for adjusting the relative angular position of the gears 70, 71.

To this end, input shaft 72 has been provided with a first pulley 80. This first pulley 80 drives a second pulley 82 via belt 81. Optionally, the first and second pulley 80, 82 are toothed pulleys and the belt 81 is a toothed belt. Alternatively, the first and second pulley 80, 82 are flat pulleys and the belt 81 is a flat belt. The first pulley 80 rotates with the input shaft 72.

Second pulley 82 drives third pulley 83 via shaft 84, friction coupling 85 and shaft 86. Third pulley 83 drives fourth pulley 88 via belt 87. Friction coupling 85 comprises friction plates that engage each other in order to transfer the rotation of shaft 84 to shaft 86. Optionally, the third and fourth pulley 83, 88 are toothed pulleys and the belt 87 is a toothed belt. Alternatively, the third and fourth pulley 83, 88 are flat pulleys and the belt 87 is a flat belt. The fourth pulley 88 rotates with the hollow shaft 74. So, input shaft 72 and hollow shaft rotate at the same angular speed.

In order to adjust the eccentricity of the eccentric device 21 with the aim of adjusting the sieving stroke and/or sieve throwing angle, the friction plates of friction coupling 85 are pulled apart, so shaft 84 is no longer coupled to shaft 86. Generally, the friction plates will only be pulled apart for a short period of time, e.g. a few seconds or even less than a second. Due to this, the input shaft 72 rotates relative to the hollow shaft 74 and the gears 70, 71 rotate relative to each other.

The friction plates are then brought into engagement with each other again, which results in a fixed relative angular position of the gears 70, 71 again.

In a variant of the embodiment of FIGS. 10 and 11, a friction coupling can be arranged between first pulley 80 and fourth pulley 88. Belts 81, 87, second pulley 82, third pulley 83, shafts 84, 86 and friction coupling 85 can then be omitted.

FIG. 12 shows a third embodiment of an adjustable eccentric device 21, in front view and in perspective.

In the embodiment of FIG. 12, input shaft 90 is fixedly connected to flange 91, so that flange 91 rotates along with input shaft 90 around the center line of input shaft 90. Flange 91 is pivotably connected to gear 92. Gear 92 is provided with a toothing at its outer circumference. Output shaft 93 is fixedly connected to gear 92 and pivotably connected to a transmission element (not shown in FIG. 12) through a linkage pivot. Output shaft 93 rotates along with gear 92.

The embodiment of FIG. 12 further comprises an annular gear 94 that is provided with teeth both on the inner diameter and on the outer diameter. Gear 92 engages the toothing on the inner diameter of annular gear 94.

During normal operational use, annular gear 94 is stationary, which means that it does not rotate. Gear 92 rotates inside annular gear 94, as gear 92 is driven by input shaft 90 and flange 91. When the gear 92 moves to the left relative to input shaft 90, the output shaft 95 will move to the right relative to center of gear 92, due to the rotation of gear 92 that is invoked by annular gear 94. The geometry of the mechanism can be chosen such that the movements to the left and to the right that are imposed on the output shaft balance each other, so the output shaft moves up and down along a straight line.

The embodiment of FIG. 12 further comprises an adjustment gear 95 that is mounted on adjustment shaft 96. Adjustment gear 95 engages the toothing on the outer diameter of annular gear 94. Adjustment gear 95 and adjustment shaft 96 do not rotate during normal operational use of the sieve drive assembly.

When adjustment of the sieving stroke and/or sieve throwing angle is desired, adjustment gear 95 and adjustment shaft 96 are rotated, generally over less than 360°. The adjustment gear 95 drives annular gear 94, which in turn drives the gear 92 that is fixedly connected to the output shaft 93. Due to this, the position of output shaft 93 relative to the input shaft 90 changes. After the adjustment is made, adjustment gear 95 and adjustment shaft 96 are stationary again, and so is the annular gear 94.

After the adjustment, the movement of the output shaft 93 will be different than before. For example, the distance between the highest point it reaches and the lowest point it reaches relative to the input shaft 90 will be different. This influences the sieving stroke and/or the sieve throwing angle.

The invention claimed is:

1. Combine harvester comprising a combine harvester chassis and a cleaning shoe for separating threshed grain from material other than grain, said cleaning shoe comprising at least one sieve and an associated sieve drive assembly, said sieve moveable by said sieve drive assembly to perform a reciprocating sieve movement having a sieving stroke and a sieve throwing angle, wherein the sieve drive assembly comprises: a rotary drive comprising a rotatable output shaft, and a transmission that provides a connection between the rotatable output shaft of the rotary drive and the sieve, wherein the transmission is adapted to transform a rotational movement of the rotatable output shaft into the reciprocating sieve movement of the sieve, the transmission comprising an eccentric device, one or more transmission elements, and a plurality of linkage pivots, wherein the eccentric device has an input that is connected to the rotatable output shaft and an output that is pivotably connected to one of the one or more transmission elements through one of the plurality of linkage pivots, the eccentric device has an eccentricity for inducing movement of the at least one transmission element, and wherein each transmission element is associated with at least two associated linkage pivots, wherein each associated linkage pivot pivotably connects said transmission element with at least one of: another transmission element of the one or more transmission elements, the eccentric device, the sieve and the combine harvester chassis, and wherein the eccentric device is an adjustable eccentric device in which the eccentricity is adjustable in order to adjust at least one of the sieving stroke and the sieve throwing angle, the eccentric device comprising:

an input shaft having a center line, a flange fixedly connected to the input shaft in order to rotate along with said input shaft around the center line of said input shaft, a gear provided with a toothing around its outer circumference, wherein the gear is rotatably mounted onto the flange, the rotation axis of said gear being non-coaxial with respect to the center line of the input shaft, an output shaft, which is fixedly connected to said gear in order to rotate along with said gear around the rotation axis of said gear, an annular gear having a toothing on an inner diameter and an outer diameter, the toothing on the inner diameter of the annular gear engaging the toothing on the outer circumference of the gear, said annular gear being stationary during normal operational use of the sieve drive assembly, an adjustment gear, which is stationary during normal operational use of the sieve drive assembly, the adjustment gear is provided with toothing on its outer circumference that engages the toothing on the outer diameter of the annular gear.

2. Combine harvester according to claim 1, further comprising a locking device adapted to lock the eccentricity of the adjustable eccentric device.

3. Combine harvester according to claim 1, wherein the eccentric device comprises at least one of an eccentric disk and a crank.

\* \* \* \* \*